INVENTOR.
LEO RICHARD DAVIDSON
BY
Barnes, Kisselle, Laughlin & Raisch
ATTORNEYS

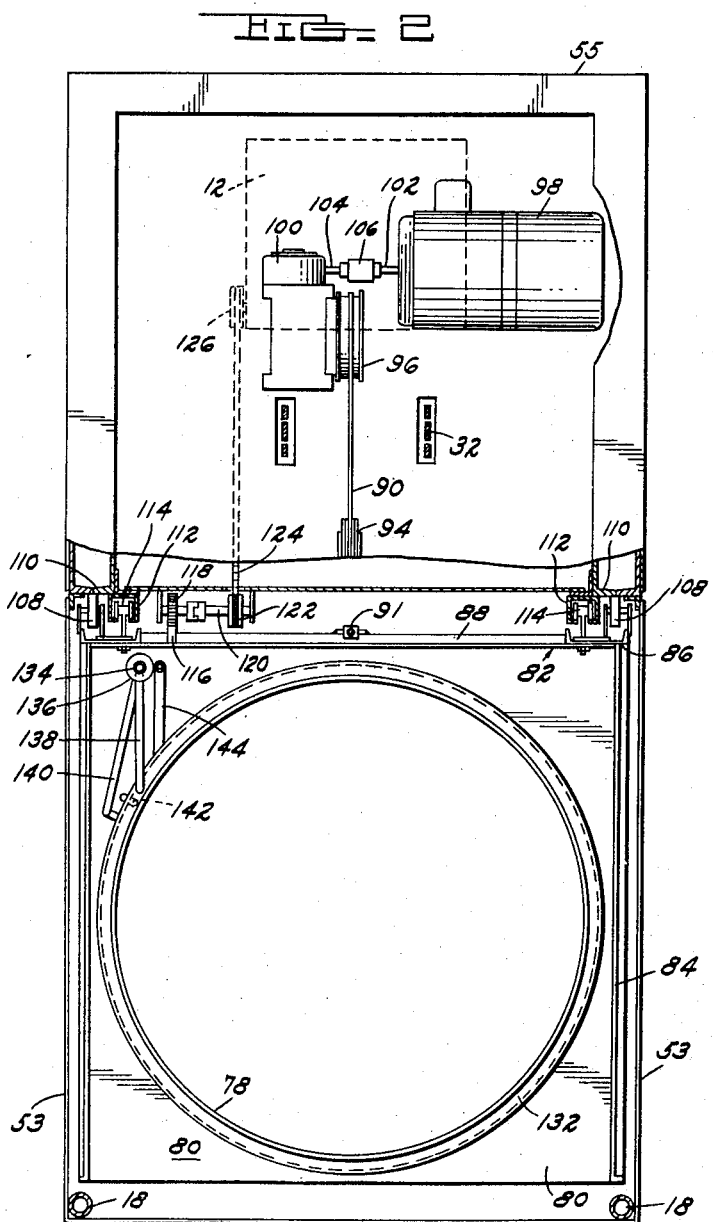

Aug. 18, 1959     L. R. DAVIDSON     2,899,777
METHOD, APPARATUS AND COMPOUND FOR
MECHANICALLY FINISHING WORK PIECES
Filed Jan. 24, 1957     4 Sheets-Sheet 3
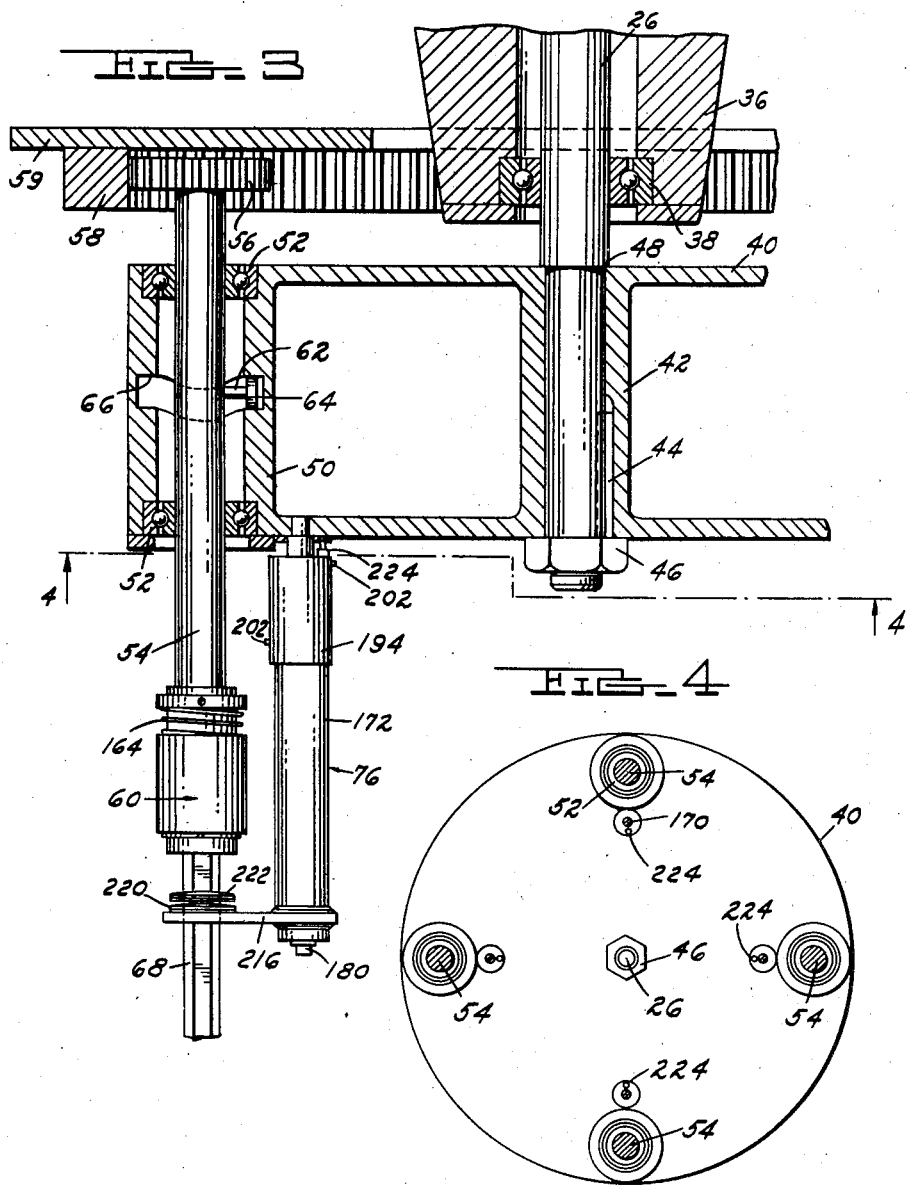
INVENTOR.
LEO RICHARD DAVIDSON
BY
Barnes, Kisselle, Laughlin & Raisch
ATTORNEYS

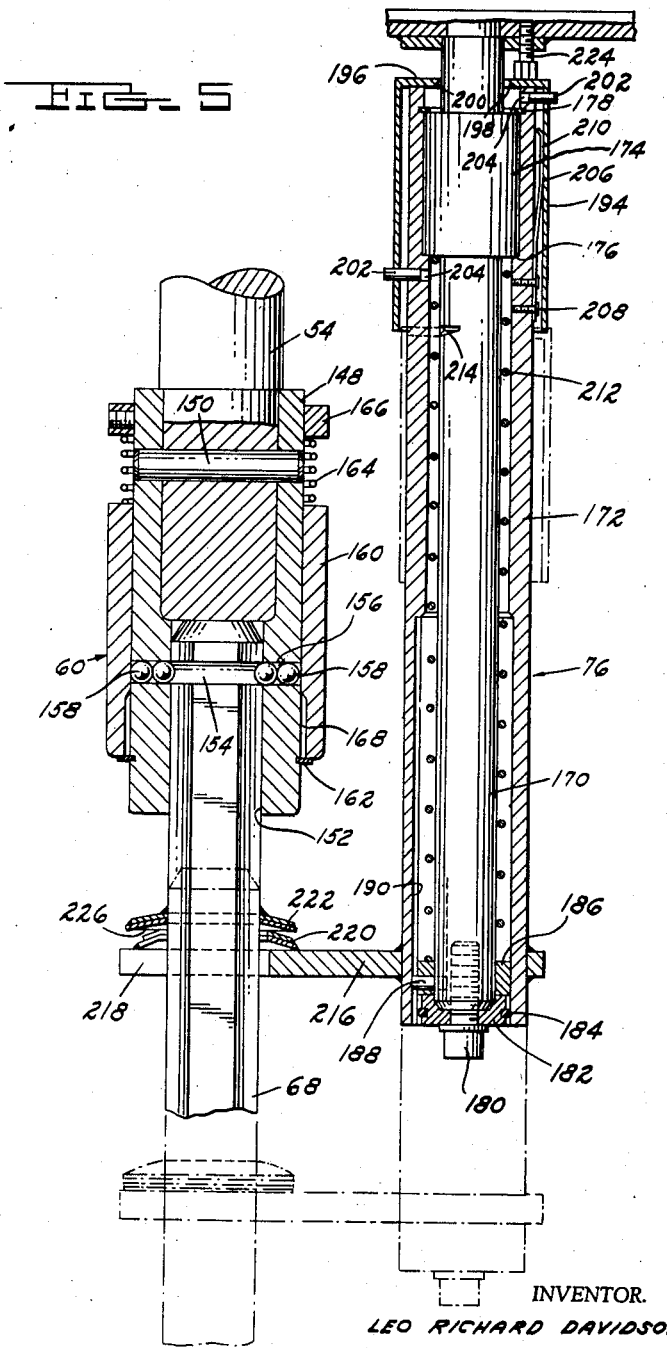

United States Patent Office 2,899,777
Patented Aug. 18, 1959

2,899,777
METHOD, APPARATUS AND COMPOUND FOR MECHANICALLY FINISHING WORK PIECES

Leo Richard Davidson, Sturgis, Mich.

Application January 24, 1957, Serial No. 636,052

29 Claims. (Cl. 51—7)

This invention relates to a method, apparatus and a compound for mechanically finishing work pieces such as castings or stampings to provide them with smooth and bright surfaces.

Castings, and particularly non-ferrous castings such as zinc base die castings, brass castings and aluminum castings, very often require considerable polishing and buffing to provide a surface thereon suitable for plating. For many years, attempts have been made to mechanically finish such work pieces by use of machines. Such attempts have not, in the long run, proved to be entirely successful; and, as a result, at the present time, a majority of polishing and buffing is done manually.

It is an object of this invention to provide a method and apparatus by means of which irregularly shaped work pieces, die castings, for example, can be finished mechanically to provide an extremely smooth surface on the work piece without requiring any manual touch-up operations. The method enables work pieces to be mechanically finished, that is, either polished, buffed or deburred, on a production basis with the expenditure of less time and money and the production of a better finish than can be accomplished by hand buffing and polishing.

The invention also has for an object the provision of a unique method of mechanically finishing work pieces by causing the work pieces to travel through a suitable media in such a manner as to maintain considerable pressure between various surfaces of the work piece and the media.

A further object of the invention resides in the provision of a new compound for mechanically finishing work pieces.

One of the essential features of the present invention resides in the moving of work pieces through a relatively large mass of finishing compound and maintaining a sufficiently large mass of compound above and around the articles as they are moved through it so that the compound is caused to flow against and around all sides of the article. The work pieces are moved through the finishing compound in a manner such that there is a continual flow of the compound in the receptacle in which it is contained. Thus, fresh compound is being continually presented to the surfaces of the work pieces that have to be polished or buffed. The use of a large mass of compound also tends to keep the compound cool. These features distinguish the present mode of mechanically finishing work pieces from those of the prior art wherein the work pieces are caused to travel through a relatively narrow and shallow trough containing a relatively small amount of compound.

In the drawings:

Fig. 2 is a sectional view of the machine taken generally along the lines 2—2 in Fig. 1.

Fig. 3 is a fragmentary sectional view of the head of the machine.

Fig. 4 is a fragmentary sectional view taken along the lines 4—4 in Fig. 3.

Fig. 5 is a vertical sectional view of one of the work holding chucks and associated loading device.

Figure 1:
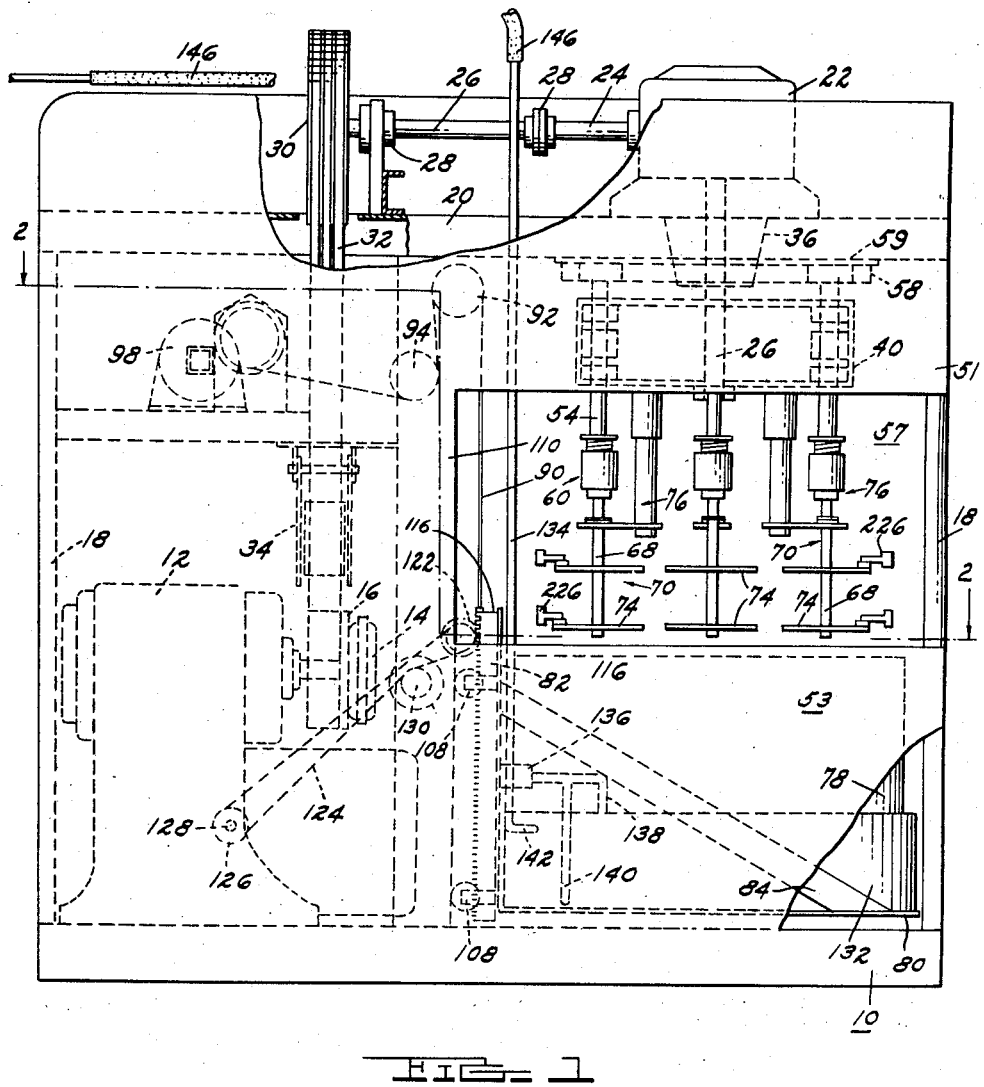
Fig. 1 is a side elevational view with portions broken away of a machine constructed in accordance with the present invention.

In order to present a clear understanding of the method of the present invention, there is illustrated in the accompanying drawings a machine which utilizes this method. Referring to Fig. 1, the machine includes a generally rectangular base 10 on which is mounted a variable speed motor 12 of the required size. The output shaft of motor 12 has mounted thereon a fluid clutch 14, and the driven member of the clutch 14 has a pulley 16 connected thereto. A Flexidine clutch, manufactured by the Dodge Manufacturing Company of Mishawaka, Indiana, is admirably suited for use as the clutch 14. The machine includes a plurality of uprights 18 on base 10 which are suitably interconnected at their upper ends by cross pieces 20 to provide a structural frame for the machine. On this frame, there is mounted a large speed reducer 22 having a horizontally extending input shaft 24 and a downwardly depending output shaft 26. Shaft 24 connects with an axially aligned shaft 26 through a coupling 28. Shaft 26 is rotatably supported as by a bearing 28 and has a large V-belt pulley 30 mounted at the free end thereof. A plurality of V-belts 32 extend around pulleys 16 and 30. The belts are maintained at their proper tension by means of any suitable belt take-up mechanism 34.

Referring now to Fig. 3, the output shaft 26 of speed reducer 22 extends downwardly through a conical extension 36 provided with a bearing 38 at its lower end in which shaft 26 is journalled. On the lower end of shaft 26, there is mounted a head 40 in the form of a casting having a central hub 42 through which shaft 26 extends. Head 40 is rotatably fixed on shaft 26 by a spline connection 44. A nut 46 on the lower threaded end of the shaft locks head 40 against a shoulder 48 on shaft 26. Head 40 is preferably of cylindrical shape, the shaft 26 extending downwardly therethrough at the center of the head (Fig. 4) Around its periphery, head 40 is provided with one or a plurality of equally spaced hubs 50 provided with bearings 52 at the upper and lower ends thereof. Within each hub 50, there is journalled in bearings 52 a spindle 54. The upper end of each spindle 54 is provided with a pinion 56 which meshes with a large ring gear 58 which is fixedly mounted on a plate 59 on the frame of the machine. At the lower end of each spindle 54, there is mounted a quick-acting chuck 60. Each spindle 54 is provided with a transverse pin 62 on which is mounted a cam follower in the form of a roller 64. A cam track is provided for each cam follower. In the arrangement shown, the cam track is in the form of a circumferential groove 66 within each hub 50. It will be appreciated, however, that the cam structure may be otherwise than as shown, the purpose of the cam being to oscillate each spindle 54 vertically as it is rotated. In this connection, it will be noted that ring gear 58 is sufficiently thick to accommodate the axial movement of pinions 56.

Each chuck 60 is designed to receive the shaft 68 of a fixture 70. Each fixture may include a plurality of rings 72 and 74 on which work pieces are adapted to be mounted. Adjacent each spindle 54, there is mounted on head 40 a fixture loading device 76. In the arrangement shown, four spindles 54 are journalled on head 40 and a fixture loading device 76 is arranged adjacent each of these spindles as illustrated in Fig. 4. With the arrangement thus far described, it will be appreciated that when motor 12 is operating, head 40 will be rotated and spindles 54 will rotate about their own axes and will reciprocate vertically.

The frame of the machine is enclosed by front, side and rear panels 51, 53 and 55, respectively. Front panels 51 and side panels 53 are cut away as shown at 57 so that spindles 54 are at all times accessible.

The polishing media is arranged to be contained within a tub 78 that is supported on a platform that includes a base 80 and an upright frame 82 that are reinforced by angularly inclined struts 84. Frame 82 includes upright channels 86 and cross members 88 which form a very rigid structure. The platform is adapted to be raised and lowered by means of a cable 90 connected thereto as at 91. Cable 90 is trained around pulleys 92 and 94 and wraps around a drum 96. Drum 96 is driven by a motor 98 through a speed reducer 100. The output shaft 102 of motor 98 and the input shaft 104 of speed reducer 100 are interconnected by a friction clutch 106. Frame 82 has four rollers 108 mounted thereon, one at each of the lower corners of the frame and one at each of the upper corners of the frame. These rollers roll vertically against a pair of upright members 110 at each side of base 10. Adjacent each of the upright members 110, there is arranged on the frame of the machine a vertically extending channel 112 in which guide rollers 114 are engaged. Guide rollers 114 are mounted one each adjacent the upper edge of frame 82 generally in horizontal alignment with the top rollers 108.

Frame 82 has mounted thereon a vertically extending gear rack 116 which meshes with a pinion 118 journalled on the frame of the machine. The shaft 120 which supports pinion 18 has a sprocket 122 fixed thereon and a chain 124 extends around sprocket 122 and a second sprocket 126 on a shaft 128, the rotation of which adjusts the variable speed control of motor 12. An idler 130 may be provided for adjusting the tension of chain 124.

Tub 78 has a water jacket 132 which underlies the bottom wall of the tub and extends upwardly around the side wall of the tub as shown in Fig. 1. Cooling water is delivered to the water jacket 132 through a vertically extending inlet pipe 134. Inlet pipe 134 has a temperature controlled valve 136 thereon that controls the flow of water into water jacket 132 through branches 138 and 140. A thermal responsive element 142 in jacket 132 is connected with valve 136 so that when the temperature of the water in jacket 132 rises above a predetermined value, valve 136 opens to admit water to jacket 132. Jacket 132 is internally baffled so that the cooling water flows through the jacket in the direction of the outlet pipe 144. At their upper ends, pipes 134 and 144 are connected by flexible hoses 146, respectively, with a source of water and a drain.

In Fig. 5, I have illustrated the construction of chuck 60 and the work loading device 76. The chuck comprises a sleeve 148 connected to the lower end of spindle 54 as by a pin 150. The lower end of sleeve 148 is fashioned with a non-circular bore, a hexagonally shaped bore 152, for example. Bore 152 is adapted to receive the upper end of the hexagonal fixture shaft 68. The upper end portion of shaft 68 is fashioned with a circumferentially extending round groove 154. When shaft 68 is fully inserted within the sleeve 148, groove 54 is aligned with radial sockets 156 in sleeve 148 in which ball members 158 are retained. An outer sleeve 160 is slidable vertically over the outer surface of sleeve 148. Outer sleeve 160 is biased downwardly against a snap ring 162 by means of a coil spring 164 acting between the upper end of sleeve 160 and a bushing 166 fixed around the upper end of inner sleeve 148. The lower end portion of sleeve 160 is fashioned with a radial enlargement as at 168 for enabling the ball members 158 to move radially outwardly out of engagement with groove 154 when sleeve 160 is shifted upwardly on the inner sleeve 148 of the chuck. With this arrangement, it will be noted that in order to secure a fixture shaft 68 to a spindle 54, it is only necessary to shift sleeve 160 upwardly, insert shaft 68 into the bore 52 to a position wherein the groove 154 is aligned with the sockets 156 and thereafter release sleeve 160 to lock the fixture shaft 68 on the spindle 154.

The fixtures 70, when loaded with work pieces to be finished, may be relatively heavy and thus, the fixture loading devices 76 are provided one adjacent each of the spindles 54. Each loading device 76 comprises a vertical shaft 170 on which an outer sleeve 172 is mounted for vertical sliding movement as by a ballbearing bushing 174 which is fixedly mounted on sleeve 172 between a shoulder 176 and a snap ring 178. At the lower end of shaft 170, there is mounted as by a screw 180 a retainer 182 carrying an O-ring 184 and a bronze bushing 186. A non-rotative connection is provided between sleeve 172 and shaft 170 by means of a key 188 in bushing 186. The outer end of key 188 engages in a vertically extending key-way 190 within sleeve 76 and the inner end of key 188 engages within a vertically extending key-way 192 on shaft 170. Over the upper end of sleeve 172, there is arranged a tubular cap 194. Cap 194 has a top wall 196 fashioned with a radially elongated aperture 198 through which shaft 170 extends. The edge of opening 198 is bevelled as at 200. Cap 194 is arranged at the upper end of sleeve 172 for radial shifting movement thereon and is thus provided with a pair of guide pins 202 which are slidably arranged in sockets 204 in sleeve 172. A leaf spring 206 extends vertically between cap 194 and the upper end of sleeve 172 and is riveted to this sleeve as at 208. The free end of spring 206 bears against the inner face of cap 194 at one side thereof as is indicated at 210. Spring 206 normally tends to bias cap 194 radially on sleeve 172 in a direction towards the right as viewed in Fig. 5 so that the bevelled edge 200 of opening 198 bears against the outer surface of shaft 170. Sleeve 172 is biased vertically upwardly on shaft 170 by means of a coil spring 212 which is compressed between the lower end of bushing 174 and the upper end of bushing 186. A notch 214 is formed on shaft 170 so that when sleeve 172 is pulled downwardly to compress spring 212, the bevelled edge 200 of opening 198 is arranged to engage in notch 214 to hold sleeve 172 in the lowered position. At the side thereof facing spindle 54, sleeve 172 has a yoke 216 welded thereto. The forked ends 218 of yoke 216 are adapted to straddle the fixture shaft 68 and have cone-shaped washers 220 welded thereon. Washers 220 are correspondingly fork shaped. Shaft 68 also has a pair of cone-shaped washers 222 welded thereon in a position such that when shaft 68 is locked within chuck 60 and sleeve 172 is in its uppermost position wherein the top wall 196 of cap 194 abuts against the adjustable stop screw 224, there is a slight clearance 226 between the washers 220 on yoke 216 and the washers 222 on shaft 68.

In operating, when it is desired to load a fixture 70 in one of the chucks 60, assuming that the sleeve 172 is in the lowered position wherein the edge 200 of opening 198 is engaged within the notch 214 on shaft 170, the fixture 70 can be slipped onto yoke 216 with the washers 222 resting upon the washers 220. Thereafter, cap 194 is tripped; that is, shifted to the left as viewed in Fig. 5 to release it from notch 214. The tension of spring 212 will lift the fixture upwardly so that the upper end of shaft 68 is received within the bore 152 of the chuck. While the shaft 68 will not be carried by spring 212 to the fully inserted position, nevertheless, spring 212 may be designed so that it requires little effort to raise the sleeve 76 when loaded to its uppermost position. Thereafter, with the outer sleeve 160 of the chuck in the raised position, the shaft 68 may be jerked upwardly slightly while at the same time releasing outer sleeve 160 so as to securely lock the shaft 168 in the chuck.

In describing the general operation of the machine, it will be appreciated that various limit switches and the like are provided for controlling the general operation of the machine, and particularly the raising and lowering of the platform on which the tub 78 is supported. In Fig. 1, the machine is illustrated in the position while the tub 78 assumes when the spindles 54 are initially loaded. At this time, tub 78 is in its lowermost position so that the fixtures 70 can be engaged within the chucks 60. After the fixtures are engaged in the chucks, the proper switches are actuated to start the operation of motors 12 and 98. Each of these motors, it will be observed, is connected with the member which it drives through a slipping clutch. Therefore, if either the head 40 of the machine or the platform which supports the tub 78 should become stuck for some reason, the jamming or breaking of any parts of the machine is avoided.

As explained previously, operation of motor 12 causes head 40 to rotate and this in turn causes the spindles 54 to revolve about shaft 26, to rotate about their own axes and to reciprocate vertically. The interconnection of shaft 128 for the variable speed drive of motor 12 with the pinion 122 is such that with the tub 78 in the lowered position, head 40 rotates at a relatively slow speed; and as the tub is elevated, pinion 122 meshes with gear rack 116 to gradually increase the speed of rotation of head 40. For example, the machine may be arranged such that the speed of head 40 is increased to about 40 r.p.m. when tub 78 is elevated to its uppermost position and is slowed down to about 25 r.p.m. when the tub moves down to its lowermost position. This variable speed drive for head 40 is important for several reasons. In the first place, as the tub moves upwardly, the fixtures 70 are projecting downwardly into the compound in tub 78; and thus, it is desirable to rotate the fixtures as they are driven downwardly into the compound. On the other hand, when the tub is lowered, it is desirable to reduce the speed of rotation of head 40 so that a minimum of compound will be thrown outwardly and possibly out of the tub.

The ratio in size between the pinions 56 at the upper ends of spindles 54 and the ring gear 58 with which the pinions 56 mesh can vary within relatively wide limits depending upon the size of work piece, the operation being performed and the finish desired. For example, on a machine having four spindles 54 arranged on a 24 inch circle, each spindle supporting a fixture carrying two 9 inch rings with five work pieces on each ring, it was found on a polishing operation with relatively small work pieces that the machine operated relatively quiet and produced a finish of from about 2 to 4 microinches where the ratios of revolution between the spindles and the head was 7 to 1 and the head rotated at about 40 r.p.m. In general, it can be said that a faster speed will produce a faster cut, but the speed of the head will be determined to a large extent by the surface condition of the work piece being finished. However, with large work pieces, there is considerable drag on the machine because of rotating the work pieces through the finishing compound; and a slower speed is a practical necessity. Likewise, if it is desired to cut rather rapidly, in a deburring operation, for example, this ratio may be decreased to 3 to 1 or even 1 to 1.

In the machine illustrated in Fig. 1, I have shown for purposes of illustration irregularly shaped work pieces arranged on some of the fixtures. In the arrangement shown, these work pieces 226 are mounted on the rings 74. In the case of some work pieces, the fixtures 74 would be fashioned as spiders with the work pieces supported on the spokes of the spiders rather than on ring 74 as illustrated. In other cases, the shape of the work piece or its size might be such that each spindle 54 would support only a single work piece in axial alignment with the spindle. In any event, in accordance with the present method, the work pieces should be arranged on the work supporting fixture so that the clearance between the work pieces and the side wall of tub 78 is maintained relatively small, for example, within a range of about 1 to 3 inches. The bottom faces of the lowermost work pieces should also be maintained rather closely spaced to the bottom wall of the tub. This arrangement of the work pieces so that they travel in a path closely adjacent the side wall and the bottom wall of the tub is a very important feature of my improved method of mechanically finishing work pieces. In the first place, it causes the polishing compound to be brought into contact with the surfaces of the work piece at a relatively high pressure, thus producing a fast cut and a desired finish. But perhaps even more important is the fact that by having the clearance between the work pieces and the side wall and bottom wall of the tub at a minimum, substantially all of the compound within the tub will be continuously circulated. Thus, fresh compound will be continually presented to the surfaces of the work pieces being finished; and since the compound behaves somewhat in the manner of an insulator, overheating of the compound is avoided. If a substantial clearance existed between the rotating work pieces and the side wall and bottom wall of the tub, a layer of compound would form around the side wall of the tub and over the bottom wall of the tub that would insulate the remainder of the compound and thus cause it to overheat. The inner side wall surface of the tub may be fashioned with vertical corrugations or baffles throughout or at localized areas to increase the pressure on the work pieces.

As pointed out above, the maintenance of a relatively small clearance between the work pieces with the side wall and bottom wall of the tub also promotes the flowing of the compound against the faces of the work piece at a relatively high pressure. Depending on the shape of the work piece, rotation of the head in one direction will in many cases produce a generally uniform cutting and polishing action on all of the faces of the work piece that have to be polished. With many work pieces, however, it will be found desirable to rotate the head 40 for a predetermined period of time in one direction and for a like period of time in the opposite direction. Other work pieces may require a rotation of their position on the fixture between cycles in order to properly finish the required surfaces thereof.

The water jacket 132 has a vertical dimension such that when the tub is charged with compound to a level slightly above the upper edge of water packet 132, the work pieces on the upper rings or spiders of the fixtures will be completely buried in the compound. The level of the compound within the tub 78 should at all times be slightly above the upper edge of water jacket 132 so that there will be no tendency for moisture to condense around the inside of the tub.

In practicing the method described herein, the compound used contributes substantially to the production of properly finished work pieces in a minimum of time and expense. This compound is also believed to be new. Generally speaking, the compound includes an abrasive grain, a media through which the abrasive is dispersed and a lubricant for bonding the abrasive to the particles of media. The type of abrasive grain that will be employed will depend to a large extent upon the type of finish it is desired to obtain. In the case of work pieces like zinc base die castings, brass castings, aluminum alloy castings or stainless steel stampings, where it is desired to obtain a bright, smooth surface, exceptionally good results have been obtained with the use of fine, unfused aluminum oxide as the abrasive. Best results have been obtained where the size of the unfused aluminum oxide particles were within a range from 300 to 325 mesh. The Aluminum Company of America sells such oxide as "Alcoa #301, 302 and 303." As a media, best results have been obtained using finely divided cob meal. However, hard wood sawdust also produces good results. As an ingredient of the lubricant, tallow, lard or any of the vegetable or animal fats may be used, However, tallow is preferred. The function of the lubricant is to coat the particles of the media with the abrasive. Howevere, tallow by itself is not a satisfactory lubricant. It does not have sufficient body and its melting temperature is too low. Thus, in combination with tallow, I have found it necessary to add other materials for raising the melting temperature of the lubricant and to give it sufficient body. The combination of stearic acid, carnauba wax and candelilla wax with tallow has produced satisfactory results, but best results have been produced when the tallow is fortified with carnauba wax and candelilla wax.

In preparing the compound, the ingredients of the lubricant are heated to about 160° F. to 180° F. and mixed with a suitable solvent such as oleum spirits, kerosene or the like, so that it has a consistency of about a light oil. This solution is then thoroughly mixed with the cob meal or sawdust. The abrasive is then added and the mixing is continued until the abrasive is uniformly dispersed throughout the mass of media and the solvent is substantially completely evaporated. Close examination of the media will reveal that the particles of cob meal or sawdust are uniformly coated with the abrasive.

The following may be considered as typical compositions of the compound:

*Example I*

|  | Percent |
|---|---|
| Tallow | 55 to 69 |
| Stearic acid | 20 to 25 |
| Candelilla wax | 5 to 15 |
| Carnauba wax | 3 to 5 |

Six pounds of the above may be combined with:

| Oleum spirits | approximately 2 qts. |
|---|---|
| Cob meal | 40 to 80 lbs. |
| Unfused aluminum oxide | ½ to 4 lbs. |

*Example II*

| Tallow | 3 lbs., 2 ozs. |
|---|---|
| Candelilla wax | 1 lb., 5½ ozs. |
| Carnauba wax | 5 ozs. |
| Oleum spirits | 2 qts. |
| Cob meal | 50 to 90 lbs. |
| Unfused aluminum oxide | 4 to 8 lbs. |

In the above examples, the proportions of cob meal or sawdust and the unfused aluminum oxide will depend upon the finish desired. A lower proportion of cob meal or sawdust and the unfused aluminum oxide produces a slower cut but a much finer finish. For example, with 50 pounds of cob meal and not more than 4 pounds of the unfused aluminum oxide, a finish of 2 to 4 microinches in about 4 minutes on a relatively good casting is not difficult to obtain. Where it is desired to obtain a satin finish and a polished surface as distinguished from a bright, smooth surface, a fine fused aluminum oxide may be substituted for the unfused aluminum oxide. However, in the case of work pieces where a bright, smooth surface is required, the results obtained with the unfused aluminum oxide have been unsurpassed. While it is possible that other abrasives might produce as smooth a surface, nevertheless, I am unaware of any other abrasive that would produce as fine a finish in as short a time.

Thus, it will be seen that I have provided a method, apparatus and a compound for mechanically finishing work pieces that eliminates the necessity for hand polishing and hand buffing of work pieces up to a moderate size. As a matter of fact, when the method of the present invention is utilized in combination with the compound disclosed, the results produced are even superior to hand polishing and hand buffing. The finish of the work pieces will be substantially uniform as distinguished from hand polishing and hand buffing where considerable variations in the finish on a single work piece is not uncommon. Thus, the present invention eliminates the need for skilled labor that has always been required to produce the very fine finishes required of many work pieces. The mechanical finishing method of this invention accomplishes all that hand polishing and hand buffing does quicker and better. The revolving of the work pieces in the manner described causes them to exert pressure against the soft mass of compound in the tub. This duplicates the pressure that an operator applies against the conventional polishing or buffing wheel. The work pieces are revolved in a manner such as to present their various surfaces to the mass of compound in the same manner that an operator presents the various surfaces of the work piece to the wheel by varying the position of the work piece. Confining the compound in a round tub prevents it from spreading and this contributes a great deal to the pressure built up in front of the work pieces being pushed around the tub by the revolving head. It will also be appreciated that by rotating the work pieces and revolving them as they travel through the mass of compound in the tub, the compound is continually mixed and furrowing is avoided. Furrowing should be avoided at all times to insure the proper flow of compound against the top, side and bottom surfaces of the work pieces mounted on the fixtures. The large mass of compound in the tub and the shape of the tub cause a continual flow of compound within the tub and thus insures the continual presentation of fresh compound to the surface of the work pieces being finished.

The function of water jacket 132 is also very important because the working of the compound in the tub has a tendency to increase its temperature substantially. The temperature of the compounds should be maintained within a range of about 150° F. to 200° F., and this will be accomplished by valve 136. I have found that best results are obtained when the temperature of the compound is maintained at about 180° F. At this temperature, the lubricant retains a satisfactory consistency. When the temperature of the compound exceeds about 200° F., the lubricant becomes very greasy; and the compound tends to "ball up." Naturally, this will not produce an efficient cutting action. Furthermore, if the temperature of the compound rises to an exceedingly high value, there is the danger of flashing because of the compound ingredients. However, as pointed out previously, the level of the compound should be above the top of the water jacket. For example, with a tub having a height of about 27 inches, a design that has proved satisfactory incorporates a water jacket which is about 12 inches high; and the compound is maintained at a level from about 1 to 2 inches above the top of the water jacket. This prevents condensation at the compound level on the side wall of the tub. However, it must be understood that even when the tub is water cooled, the compound will not last indefinitely. The mass of compound in the tub should be replenished with fresh compound from time to time. For example, with the tub containing about 400 pounds of compound, I have found it advisable to remove about 50 pounds of compound every four hours of operation and replenish it with 50 pounds of fresh compound. In this way, the results produced are generally consistent over long periods of time.

I claim:

1. A generally dry compound for mechanically finishing metallic work pieces in a single operation to produce thereon a finish suitable for decorative plating comprising a fibrous granular media having the consistency and surface characteristics on the order of a material selected from the group of cob meal and sawdust, particles of unfused aluminum oxide and a lubricant bonding said particles of unfused aluminum oxide to the particles of the media.

2. A finishing compound as called for in claim 1 wherein said lubricant consists essentially of a mixture of a fat, carnauba wax and candelilla wax.

3. A finishing compound as called for in claim 1 wherein said lubricant consists essentially of a mixture of 55% to 70% fat, 25% to 40% candelilla wax and 3% to 8% carnauba wax.

4. A finishing compound as called for in claim 1 wherein said lubricant consists essentially of about 55% to 70% tallow, 20% to 25% stearic acid, 5% to 15% candelilla wax and 3% to 5% carnauba wax.

5. A finishing compound as called for in claim 4 wherein the particles of unfused aluminum oxide are of a size falling within the range of 300 to 325 mesh.

6. A finishing compound as called for in claim 1 wherein the ingredients of said finishing compound are combined in a ratio by weight of about 85% to 90% media, 1% to 5% abrasive and 6% to 15% lubricant.

7. A generally dry compound for mechanically finishing metallic work pieces in a single operation to produce thereon a finish suitable for decorative plating comprising a fibrous granular media having the consistency and surface characteristics on the order of a material selected from the group of cob meal and sawdust and particles of a fine abrasive coating the particles of media and bonded thereto by means of a lubricant containing a fat and fortified with at least two waxes, one of which is candelilla wax, the ingredients of the compound being combined in the ratio by weight of about 85% to 90% media, 1% to 5% abrasive and 6% to 15% lubricant.

8. A finishing compound as called for in claim 7 wherein the other wax is carnauba wax.

9. A finishing compound as called for in claim 8 wherein said abrasive particles comprise aluminum oxide.

10. In a machine for mechanically finishing work pieces, a receptacle for containing finishing compound, a support journalled for rotation about a vertical axis above said receptacle, said support having at least one rotatable spindle depending therefrom, said spindle having socket means in the lower ends thereof for engaging a work holding fixture, means for moving said support and receptacle vertically relative to one another so that the work pieces supported by said spindle can be driven downwardly into the compound in said receptacle and means on said support adjacent said spindle for supporting and lifting a work loaded fixture into said socket means.

11. The combination called for in claim 10 wherein said lifting means comprises a shaft depending from said support, a sleeve surrounding said shaft and movable vertically thereof, said sleeve having a fork thereon projecting beneath said socket means, said fork being adapted to support a work holding fixture and spring means acting between said sleeve and said shaft and urging said sleeve in a direction upwardly on said shaft.

12. The combination called for in claim 11 including releasable detent means acting between said shaft and said sleeve for locking said sleeve in a lowered position against the tension of said spring means.

13. The combination called for in claim 12 wherein said detent means are spring biased to normally lock said sleeve in said lowered position on said shaft upon movement of the sleeve downwardly to a predetermined position on said shaft.

14. The combination called for in claim 13 including a fixture having a shaft adapted to be inserted in said socket means and locked therein, said fixture shaft having an enlargement thereon adapted to be engaged by said fork for lifting said shaft into engagement with said socket means.

15. The combination called for in claim 14 including means for limiting the movement of said sleeve upwardly on said first mentioned shaft to a position wherein said enlargement on said fixture shaft is spaced slightly above said fork when the fixture shaft is engaged in said socket means.

16. In a machine for mechanically finishing work pieces, the combination of a receptacle for containing finishing compound, said receptacle having a generally cylindrical upright side wall, a support, a head journalled on said support for rotation in a generally horizontal plane above the receptacle and about a generally vertical axis approximately at the center of the receptacle, a plurality of spindles depending from said head and spaced circumferentially thereof, said spindles being journalled for rotation on said head, each about an axis spaced radially from the axis of rotation of said head, means for rotating said spindles and said head about their respective axes, said spindles having adjacent the lower ends thereof work piece supporting members, said members having means thereon spaced radially from the axis of rotation of the spindles for mounting work pieces on said members whereby when said head and spindles are rotated about their respective axes, the work pieces mounted on said members are caused to revolve in the finishing compound contained in said receptacle in a path circumferentially of the receptacle and also in a path spaced radially from the axes of the spindles.

17. The combination called for in claim 16 wherein the radial spacing between the axes of rotation of the head and the spindles and between the axes of the spindles and said mounting means on said members is determined such that each work piece rotates in the course of its path of travel around the receptacle to a position closely adjacent the side wall of the receptacle.

18. The combination called for in claim 17 including means for moving the receptacle and the head vertically relative to one another.

19. The combination called for in claim 18 wherein said means for rotataing the head and the spindles are designed to rotate the spindles faster than the head whereby each work piece is intermittently moved into close proximity to the side wall of the receptacle during each revolution of the head.

20. The combination called for in claim 16 including a jacket for liquid coolant surrounding the side wall of the receptacle and means for circulating coolant through said jacket, said side wall extending upwardly beyond said jacket so that the receptacle can be loaded with finishing compound to a level above the upper end of said jacket to thereby prevent condensation on the inner surface of the receptacle.

21. The combination called for in claim 16 including means for raising and lowering the receptacle whereby to submerge and withdraw the work pieces from within the finishing compound in the receptacle, said means for rotating the head comprising a motor and a variable speed mechanism between the motor and the head for controlling the speed of rotation of said head and means responsive to the raising and lowering of the receptacle for actuating said variable speed mechanism to increase the speed of rotation of the head when the receptacle is raised and to decrease the speed of rotation of the head when the receptacle is lowered.

22. The combination called for in claim 21 including a vertically movable platform supporting said receptacle, means for guiding the vertical movement of said platform, said means for actuating said variable speed mechanism comprising a vertically extended gear rack mounted for movement with said platform, a pinion journalled on said support and engaged with said gear rack and means driven by said pinion for operating said variable speed mechanism.

23. The method of mechanically finishing the surface of a work piece which comprises submerging the work piece in a finishing compound contained within an open top, generally cylindrical receptacle, revolving the work piece in a circular path about and spaced radially from a vertical axis within the receptacle and simultaneously therewith, rotating the work piece in a second circular path about a generally vertical axis spaced radially from said first mentioned axis, said work piece being spaced substantially from said second axis whereby the work piece is caused to revolve in an undulating path within and around the receptacle.

24. The method called for in claim 23 wherein the radii of said first and second circular paths are dimensioned such that the path of the work piece is closely adjacent the side wall of the receptacle at successive locations spaced apart circumferentially around the receptacle.

25. The method called for in claim 23 including the step of oscillating said work piece vertically as it travels in said path.

26. The method called for in claim 23 wherein the temperature of said finishing compound is maintained between 150° F. to 200° F.

27. The method called for in claim 23 wherein said finishing compound comprises a fibrous granular media having the consistency and surface characteristics on the order of a material selected from the group of cob meal and sawdust, particles of unfused aluminum oxide coating the media and a lubricant bonding the unfused aluminum oxide particles to the particles of the media.

28. The method called for in claim 27 wherein the lubricant consists essentially of a mixture of a fat, carnauba wax and candelilla wax.

29. The method of mechanically finishing the surface of a work piece which comprises submerging the work piece in a finishing compound contained within an open top, generally cylindrical receptacle, rotating the work piece in a circular path about a generally vertical axis which is spaced radially from the work piece and also spaced radially from the axis of the receptacle and relatively revolving the work piece and the receptacle about the vertical axis of the receptacle whereby the work piece is caused to revolve in an undulating path within and around the receptacle.

References Cited in the file of this patent

UNITED STATES PATENTS

| | | |
|---|---|---|
| 2,062,671 | Lupo | Dec. 1, 1936 |
| 2,185,262 | Lupo | Jan. 2, 1940 |
| 2,545,291 | Lupo | Mar. 13, 1951 |
| 2,589,782 | Creek | Mar. 18, 1952 |
| 2,664,676 | Cuppers | Jan. 5, 1954 |
| 2,749,669 | Sleeper | June 12, 1956 |